United States Patent
Salminen et al.

(10) Patent No.: US 9,617,621 B2
(45) Date of Patent: Apr. 11, 2017

(54) METHOD FOR TREATING A SOLUTION CONTAINING ZINC SULPHATE

(75) Inventors: Justin Salminen, Helsinki (FI); Teppo Riihimäki, Linnavuori (FI); Mikko Ruonala, Kantvik (FI)

(73) Assignee: OUTOTEC OYJ, Espoo (FI)

( * ) Notice: Subject to any disclaimer, the term of this patent is extended or adjusted under 35 U.S.C. 154(b) by 1042 days.

(21) Appl. No.: 13/878,025

(22) PCT Filed: Oct. 7, 2011

(86) PCT No.: PCT/FI2011/050863
§ 371 (c)(1),
(2), (4) Date: Apr. 5, 2013

(87) PCT Pub. No.: WO2012/049361
PCT Pub. Date: Apr. 19, 2012

(65) Prior Publication Data
US 2013/0192424 A1    Aug. 1, 2013

(30) Foreign Application Priority Data
Oct. 12, 2010    (FI) ...................................... 20100345

(51) Int. Cl.
*C22B 58/00* (2006.01)
*C22B 3/46* (2006.01)
(Continued)

(52) U.S. Cl.
CPC .............. *C22B 58/00* (2013.01); *C22B 3/46* (2013.01); *C22B 19/16* (2013.01); *C22B 41/00* (2013.01); *Y02P 10/234* (2015.11)

(58) Field of Classification Search
None
See application file for complete search history.

(56) References Cited

U.S. PATENT DOCUMENTS 5,431,713 A    7/1995    Myerson et al.
5,858,315 A    1/1999    Van Put et al.
(Continued)

FOREIGN PATENT DOCUMENTS

FI    DE 3819020 A1 *  12/1988    ............... C01G 9/06
FI    118 226 B    8/2007
(Continued)

OTHER PUBLICATIONS

International Search Report (PCT/ISA/210) issued on Jan. 12, 2012, by the Finnish Patent Office as the International Searching Authority for International Application No. PCT/FI2011/050863.
(Continued)

*Primary Examiner* — Melissa Swain
(74) *Attorney, Agent, or Firm* — Buchanan, Ingersoll & Rooney PC

(57) ABSTRACT

The invention relates to a method for treating a solution containing zinc sulphate, so that at least one of the rare metals such as indium, gallium and germanium can be separated from it. A portion of the metals to be separated can be precipitated from zinc sulphate solution by neutralizing the acidic solution and at least a portion is cemented by means of metal powder. The solid precipitates that are formed can be combined and treated subsequently in some suitable way to leach out the desired metals.

11 Claims, 2 Drawing Sheets

Figure 1:
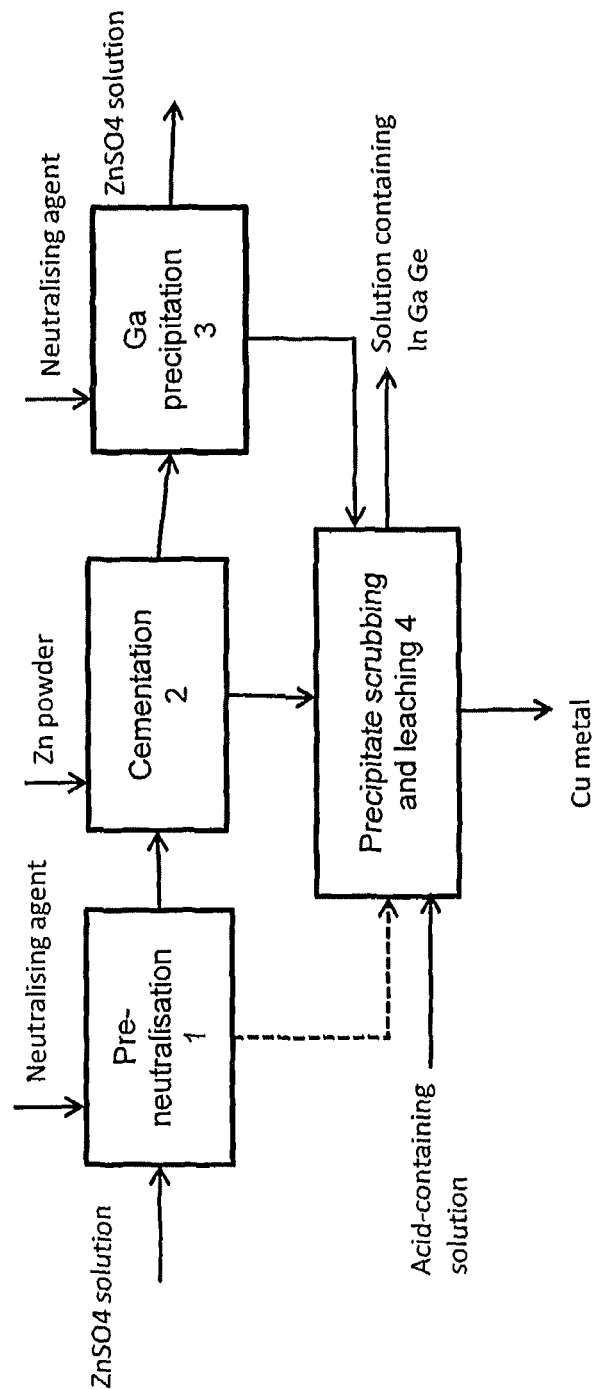

(51) Int. Cl.
     *C22B 19/16*      (2006.01)
     *C22B 41/00*      (2006.01)

(56)               References Cited

U.S. PATENT DOCUMENTS

| | | |
|---|---|---|
| 6,340,450 B1 | 1/2002 | Fugleberg et al. |
| 6,475,450 B1 | 11/2002 | Saruta et al. |
| 7,118,719 B2 | 10/2006 | Fugleberg |
| 7,811,357 B2 | 10/2010 | Lahtinen et al. |
| 2008/0271572 A1 | 11/2008 | Lahtinen et al. |

FOREIGN PATENT DOCUMENTS

| | | | |
|---|---|---|---|
| JP | 59-067330 A | | 4/1984 |
| JP | 59067330 A | * | 4/1984 |
| JP | 63140047 A | * | 6/1988 |
| JP | 2006-219719 A | | 8/2006 |
| JP | 2007-246988 A | | 9/2007 |
| JP | 2007246988 A | * | 9/2007 |
| JP | 2009-522442 A | | 6/2009 |
| WO | WO 2004/076698 A1 | | 9/2004 |
| WO | WO 2007/074207 A1 | | 7/2007 |

OTHER PUBLICATIONS

International Preliminary Report on Patentability (PCT/IPEA/409) issued on Jan. 25, 2013, by the Finnish Patent Office for International Application No. PCT/FI2011/050863.
Finnish Search Report issued on Aug. 18, 2011.
Japanese Office Action (Notification of Reasons for Refusal) dated Jul. 30, 2014, issued by the Japanese Patent Office in corresponding Japanese Patent Application No. 2013-533248 (4 pages).

* cited by examiner

METHOD FOR TREATING A SOLUTION CONTAINING ZINC SULPHATE

FIELD OF THE INVENTION

The invention relates to a method for treating a solution containing zinc sulphate, so that at least one of the rare metals, such as indium, gallium and germanium, can be separated from it. Some of the metals to be separated can be precipitated from zinc sulphate solution by neutralising an acidic solution and at least some are cemented by means of metal powder. The solid precipitates that are formed can be combined and treated subsequently in a suitable manner.

BACKGROUND OF THE INVENTION

Sulphidic zinc concentrate often also contains small amounts of other valuable metals, such as copper, lead and silver as well as rarer metals, such as indium, gallium and germanium.

The traditional method for treating sulphidic zinc concentrate is concentrate roasting, in which the sulphidic concentrate is roasted to zinc oxide and the iron in the concentrate forms mainly zinc ferrite. Zinc oxide dissolves fairly easily, so that in the first stage the calcine is subjected to leaching, known as neutral leaching. Zinc ferrite remains undissolved in neutral leaching and strong acid leaching is often used to recover zinc from ferrite. Zinc ferrite precipitate also contains the ferric iron precipitate that was precipitated in neutral leaching. For its part the ferric iron precipitate contains not only ferric hydroxide but also co-precipitated aluminium hydroxide and rare metals such as gallium and indium. Ferrite precipitate may also be fed into a Waelz furnace, in which zinc is evaporated from it, and is then oxidised into zinc oxide and fed back into the leaching process. Waelz oxide can also be processed in a separate process stage in order to recover the other metals such as indium that were co-precipitated into it.

Nowadays the trend has been more and more for processes in which at least some of the sulphidic zinc concentrate is fed directly to leaching without roasting. This enables the processing of impure and fine-ground concentrates. The direct leaching process of zinc sulphide concentrate can be performed in either an atmospheric or pressure leaching process. However, the leaching of zinc sulphide requires a far higher acid concentration than that used in the neutral leaching of calcine, but since the production of elemental zinc almost always occurs electrolytically, the spent acid from electrolysis can be used for concentrate leaching. The highest acid concentration of all is required in the leaching of zinc ferrite formed in roasting. Sulphide concentrate leaching can be combined with a process in which the leaching of ferrites formed in roasting occurs as a strong acid leach and thus ferrite leaching is performed in the same context as concentrate leaching. In this case what is known as a countercurrent leaching process is used, where in addition to a strong acid leaching stage enabling zinc ferrite leaching there is also a low acid leaching stage. A significant part of the concentrate leaching in fact occurs in the low acid leaching (LAL) stage. This type of method is described for instance in U.S. Pat. Nos. 6,475,450, 5,858,315 and 6,340,450 as well as WO publication 2004/076698.

The impurities in the zinc sulphate solution formed in leaching are removed before the solution is routed to electrolysis. Iron is removed by neutralising and oxidising the divalent iron in solution to trivalent, so that the iron is precipitated depending on the conditions as goethite, jarosite or hematite. Other metallic impurities, for example copper, nickel, cobalt and cadmium, are removed mainly by cementing them with metallic zinc powder after iron precipitation. Cementation is based on the oxidation-reduction potentials where the more base metal is oxidised and releases its electrons to the more noble metal in the solution, which is reduced and cemented out of the solution. Zinc is typically recovered from solution by means of electrolysis and impurities, for example cobalt, copper and nickel, diminish the current efficiency of electrolysis. Germanium and cobalt together form a real electrolysis poison, because the metals are precipitated and cause the formation of hydrogen. Indium and gallium do not generally reach as far as electrolysis because they are precipitated out during iron precipitation.

When zinc concentrate contains rare metals such as indium and gallium, it is often desirable to recover them. One possible way to carry out recovery of these metals is to process the neutral leaching residue into Waelz oxide in a Waelz furnace, and then leach the oxide, so that the metals that ended up in the oxide can be put back into the solution and further recovered with solvent extraction. This kind of indium and gallium recovery in the context of a Waelz oxide leaching process is known technology. This process is aided by the fact that these metals have already enriched the Waelz oxide, because they co-precipitate with ferric hydroxide in neutral leaching. In accordance with the method, the zinc oxide containing a valuable metal is leached by means of sulphuric acid, so that in addition to the zinc the indium also dissolves, and the lead and silver and other inert compounds in the oxide remain in the precipitate. The solution is routed to indium extraction, where the indium is separated from the zinc, and the zinc sulphate solution is routed to the neutral leaching stage. If the concentrate contains gallium, its recovery takes place in principle in conjunction with indium recovery, whereupon indium and gallium are separated into their own phases.

U.S. Pat. No. 7,118,719 discloses a zinc process based on calcine leaching, in which iron is subjected to hydrolytic precipitation as jarosite. In the method the solution exiting strong acid leaching is reduced so that the all the iron in solution is reduced to divalent. The reduced solution is routed to neutral leaching. It is stated in the publication that some of the solution entering neutral leaching can be routed to a sidestream and neutralised to a pH value of at least 4, so that an iron-free precipitate containing Ga, In and Ge is obtained.

A method is disclosed in patent publication FI 118226 for recovering at least one rare metal, such as indium and/or gallium in conjunction with zinc sulphide concentrate leaching. Zinc sulphate solution, which is generated during direct concentrate leaching and contains iron and rare metals, is routed to a neutralisation and precipitation stage, in which the solution is neutralised to a pH range of 2.5-3.5. The amount of trivalent iron in the solution is controlled to be such that it is sufficient to co-precipitate the indium and/or gallium in the solution.

PURPOSE OF THE INVENTION

The purpose of the invention presented here is to provide a method which enables the separation of the indium, gallium and germanium that appear in a zinc sulphide concentrate from a solution containing zinc sulphate. The separation of the metals in question occurs at least partially by reducing them from the solution by means of zinc powder simultaneously with copper cementation. A portion of the separation of the metals in question takes place advantageously by neutralising the solution.

SUMMARY OF THE INVENTION

The invention relates to a method for treating an acidic solution containing zinc sulphate in order to separate at least one metal in the solution from the solution, where the metal to be separated is one of the following group: indium, gallium and germanium. In accordance with the method, the solution containing zinc sulphate is neutralised and at least one of the group of metals to be separated can be separated from the solution in the cementation stage by means of zinc powder.

It is typical of the method accordant with the invention that before cementation the solution containing zinc sulphate is neutralised in a pre-neutralisation stage to a pH value of 2.5-3.5. The precipitate formed in the pre-neutralisation stage contains the first portion of the gallium and indium in the zinc sulphate solution.

According to one embodiment of the invention, the precipitate formed in the pre-neutralisation stage is separated from the solution containing zinc sulphate by solids-liquid separation and the precipitate that is generated is routed to the precipitate scrubbing and leaching stage.

According to one other embodiment of the invention, the precipitate formed in the pre-neutralisation stage is not separated from the solution containing zinc sulphate but instead the solids-containing solution is routed to the cementation stage.

It is also typical of the method accordant with the invention that the zinc sulphate solution also contains copper, which is cemented from the solution in the cementation stage.

According to one embodiment of the invention, in the cementation stage the germanium contained in the zinc sulphate solution is cemented from the solution. In the cementation stage, a second portion of the indium contained in the solution is preferably also cemented from the zinc sulphate solution. Likewise in the cementation stage a second portion of the gallium contained in the zinc sulphate solution is preferably precipitated from the solution.

According to one embodiment of the invention, in the cementation stage the metals cemented from the zinc sulphate containing solution are separated from the solution by solids-liquid separation and routed to the precipitate scrubbing and leaching stage.

According to one embodiment of the invention, when the zinc sulphate solution contains gallium, the solution is routed after cementation to a gallium precipitation stage, where the solution is neutralised to a pH value of 3.2-4.0 in order to precipitate a third portion of the gallium.

According to one other embodiment of the invention, the precipitate formed in the cementation stage is not separated from the zinc sulphate solution but instead the solids-containing solution is routed to the gallium precipitation stage.

According to a further embodiment of the invention, the precipitate formed in the pre-neutralisation and cementation stages is not separated from the zinc sulphate solution but instead the solids-containing solution is routed to the gallium precipitation stage.

It is typical of the method accordant with the invention that the precipitate generated in the gallium precipitation stage is routed to the precipitate scrubbing and leaching stage.

According to one embodiment of the invention, the precipitates formed in the cementation and precipitation stages are treated jointly with an acid-containing solution in the precipitate scrubbing and leaching stage in order to leach out the metals to be separated and to separate them from the metallic copper deposit.

LIST OF DRAWINGS

FIG. 1 is a flowsheet of one method accordant with the invention, and

Figure 2:
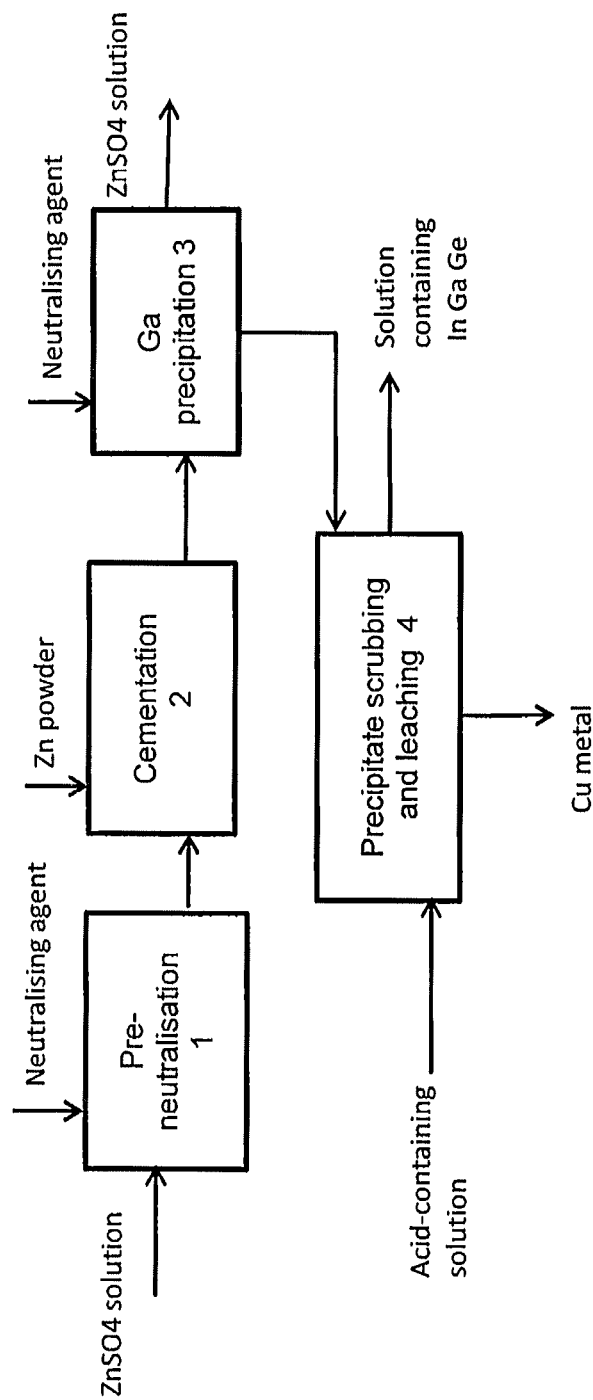

FIG. 2 presents a flowsheet of another embodiment accordant with the invention.

DETAILED DESCRIPTION OF THE INVENTION

In the method accordant with the invention, the solution containing zinc sulphate, which includes one or more of the metals indium, gallium and germanium, may be for instance a solution exiting the low acid leach (LAL) of the direct leaching of a zinc sulphide concentrate or a solution exiting the conventional strong acid leach of a calcine. At this stage the zinc sulphate solution still contains all the dissolved iron and other metallic impurities. The solution at this stage is typically acidic, i.e. it contains free acid (10-30 g/l $H_2SO_4$), so that the iron in solution is almost all divalent ($Fe^{2+}$) and only a small amount is trivalent ($Fe^{3+}$).

FIG. 1 shows one embodiment of the method accordant with the invention. In this embodiment an acidic zinc sulphate containing solution is first subjected to pre-neutralisation 1, for example by means of a calcine (zinc oxide) or a suitable calcium compound, so that the small amount of trivalent iron in the solution is precipitated. If the neutralising agent used is a calcium compound, gypsum is also precipitated from the solution. The most advantageous pH range in which to neutralise the solution is around 2.5-3.5, so that the solution no longer contains free acid. If the solution contains gallium and indium, the first portion of said metals is precipitated in the neutralisation stage, but only very little of the germanium. Since the amount of solids precipitating during neutralisation is generally small, the solution does not necessarily require solids-liquid separation but instead the solids-containing solution is routed to the next stage, which is cementation carried out by means of zinc powder. The dashed line in FIG. 1 illustrates an alternative, according to which solids-liquid separation is performed in conjunction with pre-neutralisation, and the precipitate is fed into joint scrubbing and leaching stage 4 of precipitates from various stages. If the amount of gallium in the zinc sulphate solution is marginal with regard to its monetary value, the whole pre-neutralisation stage can be omitted and the solution can be subjected to neutralisation during cementation stage 2. In pre-neutralisation conditions, gallium is precipitated clearly more strongly than indium.

The pre-neutralised zinc sulphate solution, in which a deposit generated in pre-neutralisation may be present, is routed to cementation stage 2, where germanium and a second portion of the indium are reduced to metal and cemented. However, in accordance with the oxidation-reduction potential of the metals, the copper in solution is reduced first and after that the other metals to be cemented according to the electrochemical series. When the solution contains cadmium for example, this is also reduced, but it is not depicted in detail in this context. Since gallium is very close to zinc in the electrochemical series it is not cemented in this stage, but a second portion of it is precipitated. Iron remains in solution in divalent form during cementation and is not precipitated with the other metals. It is advantageous to maintain the pH of the cementation stage at a value of 3-3.5.

After the cementation stage, solids-liquid separation is performed and the solids generated are routed to joint precipitate scrubbing and leaching stage 4. Solids-liquid separation is typically thickening and filtration. If in this stage the amount of solids formed is also small, the solids-containing solution can be routed to the final treatment stage without solids-liquid separation. If the amount of germanium in the zinc sulphate solution is significant, it is preferable in some cases to separate the cementation precipitate from solution before the final neutralisation stage, because the higher pH in the final treatment stage may in some cases cause the germanium for example to dissolve again.

When the zinc sulphate solution contains gallium in particular, it is advantageous for gallium precipitation to perform a second neutralisation stage 3 after cementation, in which the pH of the solution is raised to a value of 3.2-4. Neutralisation is performed with some suitable substance, such as calcine or Waelz oxide. Neutralisation results in a hydroxide precipitate, which consists of a third portion of the gallium that did not precipitate earlier, as well as very small amounts of germanium and indium. Since the majority of the deposit generated in this stage is composed of gallium, it is named Ga precipitation stage 3 in the drawing. After the Ga precipitation stage, the solution is subjected to solids-liquid separation, which is either separation of the solids from this stage only or joint solids separation for all the process stages described above. However, if the amount of gallium in the zinc sulphate solution is very small in terms of monetary value, the Ga precipitation stage may be omitted.

The solids that are formed is routed to precipitate scrubbing and leaching stage 4, in which the precipitated and cemented solids are scrubbed with an acid-containing solution so that the indium, gallium and germanium dissolve, but the copper remains as a metallic deposit. Indium, gallium and germanium are recovered from the acidic solution by means of extraction for example.

The method is described above in stages, but in practice the different stages can be performed in a single or several consecutive reactors as a continuous process, particularly when there is no solids-liquid separation between the stages. FIG. 2 presents an alternative solution, according to which there is no solids-liquid separation between pre-neutralisation, cementation and Ga precipitation, and instead the solids-bearing solution is routed from pre-neutralisation stage 1 to cementation stage 2 and on to Ga precipitation stage 3 and solids-liquid separation 4 is only performed thereafter.

The cementation stage belonging to the method accordant with the invention is particularly advantageous, in that it enables the majority of the germanium and a considerable portion of the indium and gallium to be recovered in the cementation stage. Copper is also removed from solution in the cementation stage, thus preventing the copper from ending up in the iron precipitate in the subsequent iron removal stage.

EXAMPLES

Example 1

The example illustrates a pre-neutralisation stage, whereby a zinc sulphate solution with a pH of 2 was neutralised in stages with zinc oxide to a pH value of 3.

A zinc sulphate solution was placed in a 2 L glass reactor, which was equipped with a back-flow condenser, a mixer, thermometer, and pH and redox sensors. The solution was heated on a hot plate to a temperature of 65° C. As the test proceeded the pH value was raised gradually with fine zinc oxide. The system was allowed to stabilise at each pH stage (45 min) before taking a sample. After sampling more zinc oxide was added, until the next pH value was reached. During sampling the pH and redox values were measured. The test results are presented in Table 1.

TABLE 1

Solution concentrations in the pre-neutralisation stage

| pH | Redox mV | Cu mg/l | Fe mg/l | Ga mg/l | Ge mg/l | In mg/l | Zn mg/l |
|---|---|---|---|---|---|---|---|
| 2.1 | 367 | 1780 | 14200 | 130 | 108 | 105 | 124100 |
| 2.5 | 353 | 1570 | 12400 | 117 | 97.3 | 92.2 | 107800 |
| 2.8 | 300 | 1640 | 12500 | 79.6 | 96.7 | 87.3 | 114700 |
| 3.0 | 261 | 1630 | 12900 | 48.5 | 92.2 | 80.3 | 117000 |

The table shows that copper, iron and zinc were not significantly precipitated, but the gallium concentration in solution fell from a level of 130 mg/l to al level of 48.5 mg/l and indium from a level of 105 mg/l to a concentration of 80.3 mg/l. A small amount of germanium was also precipitated.

Example 2

In this test the cementation of a zinc sulphate solution was performed at a pH value of around 3.

The test arrangement was similar to that in pre-neutralisation example 1. A zinc sulphate solution was prepared for the test. Its initial concentration is shown in Table 2 at a moment before the zinc powder was added. In the test, zinc powder was added gradually 1.5 g at a time, after which the slurry was allowed to stabilise for 30 min before taking a sample, after which the next dose of zinc powder was added. During sampling the pH and redox values were measured. The cementation test results are presented in Tables 2 and 3.

TABLE 2

Cementation of zinc solution at pH 3, solution analyses

| Redox mV | pH | Zn addition g | Cu mg/l | Fe mg/l | Ga mg/l | Ge mg/l | In mg/l | Zn g/l |
|---|---|---|---|---|---|---|---|---|
|  |  | 0 | 917 | 9100 | 103 | 104 | 83.3 | 91.8 |
| 366 | 3.0 | 1.5 | 580 | 9490 | 80.6 | 89.9 | 68 | 93.2 |
| 345 | 3.0 | 3.0 | 271 | 8470 | 66.7 | 76.4 | 56.1 | 83.7 |
| 295 | 3.0 | 4.5 | 98 | 8540 | 54 | 75.7 | 43.6 | 87.0 |
| 410 | 3.0 | 6.0 | 0.3 | 8090 | 74 | 76.1 | 20.6 | 85.8 |
| −250 | 3.0 | 7.5 | <0.5 | 7760 | 70.4 | 45.6 | 1.2 | 81.6 |
| −480 | 3.0 | 9.0 | 0.5 | 7820 | 67.4 | 30.1 | <1 | 82.1 |
| −500 | 3.0 | 10.5 | <0.5 | 7660 | 62.8 | 14.7 | <1 | 79.5 |
| −540 | 3.0 | 12.0 | <0.5 | 7000 | 60.3 | 6.3 | <1 | 76.4 |

TABLE 3

Cementation of zinc solution at pH 3, precipitate analyses

| Redox mV | pH | Zn addition g | Cu % | Fe % | Ga % | Ge % | In % | Zn % |
|---|---|---|---|---|---|---|---|---|
|  |  | 0 |  |  |  |  |  |  |
| 366 | 3.0 | 1.5 | 19.4 | 1.3 | 1.02 | 0.07 | 1.00 | 51.6 |
| 345 | 3.0 | 3.0 | 16.9 | 0.9 | 0.96 | 0.03 | 0.99 | 55.1 |

TABLE 3-continued

Cementation of zinc solution at pH 3, precipitate analyses

| Redox mV | pH | Zn addition g | Cu % | Fe % | Ga % | Ge % | In % | Zn % |
|---|---|---|---|---|---|---|---|---|
| 295  | 3.0 | 4.5  | 14.3 | 0.6 | 1.20 | 0.02 | 1.27 | 56.1 |
| 410  | 3.0 | 6.0  | 35.9 | 0.8 | 0.82 | 0.08 | 2.83 | 19.9 |
| −250 | 3.0 | 7.5  | 32.8 | 0.8 | 0.66 | 0.17 | 3.19 | 23.8 |
| −480 | 3.0 | 9.0  | 27.4 | 0.7 | 0.62 | 0.21 | 2.69 | 36.3 |
| −500 | 3.0 | 10.5 | 32.4 | 0.9 | 0.73 | 0.26 | 3.17 | 24.9 |
| −540 | 3.0 | 12.0 | 35.5 | 1.1 | 0.80 | 0.25 | 3.48 | 18.9 |

Table 2 shows that the copper and indium were reduced completely and cemented out of the solution and that the germanium was almost completely reduced when the pH of the solution was at a value of around 3.0. Some of the gallium was also precipitated out, but since the melting point of gallium is around 30° C., it could not be reduced, and instead was precipitated as some compound e.g. a hydroxide. The precipitate analysis in Table 3 shows that the concentration of indium in particular, but also that of gallium and germanium in the precipitate were of such an order of magnitude that separating them in a later leaching stage would produce a solution whose further processing is economically viable.

Example 3

The test arrangement was similar to that in pre-neutralisation example 1 and example 2. A zinc sulphate solution was prepared for the test, with the initial concentration that is shown in Table 4. The pH of the solution was initially 2.5, and the solution was neutralised in the way accordant with example 1. After this, the solution was subjected to cementation in the manner according to example 2, at a pH value of about 3.5. The results are shown in Table 4. The solution analyses are given in the upper section of the table and the precipitate analysis in the lower section of the table. The table shows that in particular indium and germanium are recovered well when the solution is first pre-neutralised and then cemented with zinc powder. About 20% of the gallium remained in solution, but this can be precipitated out of solution by neutralising the solution further.

TABLE 4

Neutralisation of zinc solution from a pH value of 2.5 to a value of 3.5 and cementation at a pH value of about 3.5.

| pH | Redox mV | Zn addition g | Cu mg/l | Fe g/l | Ga mg/l | Ge mg/l | In mg/l | Zn g/l |
|---|---|---|---|---|---|---|---|---|
| 2.5 | 575  | —   | 970  | 12.1 | 121  | 103  | 56.6 | 105.1 |
| 2.8 | 600  | —   | 909  | 9.88 | 111  | 100  | 52   | 96.7  |
| 3.1 | 613  | —   | 900  | 10.3 | 85.5 | 89.5 | 42.5 | 99.7  |
| 3.5 | 700  | —   | 866  | 10.6 | 25   | 73.4 | 28.4 | 103.0 |
| 3.7 | 110  | 1.5 | 241  | 9.37 | 7.3  | 26.7 | 5.5  | 95.8  |
| 3.7 | 97   | 3.0 | 323  | 8.91 | 10.3 | 33.1 | 9.1  | 95.3  |
| 3.3 | 28   | 4.5 | 64   | 9.63 | 37.6 | 58.5 | 23.6 | 96.0  |
| 3.4 | −442 | 6.0 | 6.1  | 8.11 | 38.2 | 19.2 | 12.3 | 84.7  |
| 3.3 | −484 | 7.5 | 0.8  | 8.06 | 36.9 | 5    | 2.8  | 85.3  |
| 3.5 | −492 | 9.0 | <0.5 | 7.95 | 25.5 | 1.3  | <1   | 82.0  |

| pH | Redox mV | Zn addition g | Cu % | Fe % | Ga % | Ge % | In % | Zn % |
|---|---|---|---|---|---|---|---|---|
| 3.7 | 110  | 1.5 | —    | —    | —    | —    | —    | —    |
| 3.7 | 97   | 3.0 | 20.2 | 18.5 | 1.7  | 0.12 | 1.04 | 14.2 |
| 3.3 | 28   | 4.5 | 37.7 | 14.5 | 1.86 | 0.16 | 1.08 | 9.7  |
| 3.4 | −442 | 6.0 | 34.7 | 7.95 | 1.21 | 0.26 | 1.43 | 13.6 |
| 3.3 | −484 | 7.5 | 38.6 | 7.62 | 1.71 | 0.40 | 2.18 | 8.4  |
| 3.5 | −492 | 9.0 | 39.3 | 8.33 | 2.07 | 0.43 | 2.39 | 4.3  |
|     |      |     | 38.5 | 8.27 | 2.29 | 0.40 | 2.4  | 6.6  |

Example 4

The test according to the example was performed in the same way as in example 3, but the initial concentrations of indium, gallium and germanium that were used were lower than in example 3. The results are shown in Table 5. Copper, indium and germanium were reduced fairly completely to metallic in zinc powder cementation, even though it can be seen that a small amount of the indium had redissolved. Gallium is partially precipitated when the solution is neutralised from a pH value of 2.5 to a value of 3.5, but gallium is precipitated in its entirety in the Ga precipitation stage, when the solution is neutralised to a pH value of 4.0. The example also leads to the conclusion that in this stage some of the germanium redissolves, so that if the amount of germanium in the feed solution is considerable, it is advantageous to route the solution to solids-liquid separation before Ga precipitation.

TABLE 5

Neutralisation of zinc solution from a pH of 2.5 to 3.5 and cementation at a pH of 3.5 and final neutralisation at pH 4.0.

| | In mg/l | Ga mg/l | Cu mg/l | Fe g/l | Ge mg/l | Zn g/l |
|---|---|---|---|---|---|---|
| Feed solution | 34 | 56 | 975 | 11.3 | 47 | 105 |
| Precipitation | | | | | | |
| Start, pH 2.5 | 34 | 58 | 966 | 11.2 | 47 | 103 |
| Precipitation, pH 3.1 | 28.6 | 0.27 | 975 | 11.1 | 43 | 107 |
| Precipitation, pH 3.5 | 15.6 | 0.04 | 940 | 11 | 31 | 105 |
| Cementation, pH 3.5 | | | | | | |
| 1. Zn addition, 1.5 g | 8.5 | 0.08 | 752 | 10.8 | 29 | 102 |
| 2. Zn addition, 1.5 g | 9.4 | 0.17 | 303 | 11 | 36 | 107 |
| 3. Zn addition, 1.5 g | 5.4 | 0.18 | 12 | 10.8 | 13 | 109 |
| 4. Zn addition, 1.5 g | 8.8 | 0.15 | 6.1 | 10.5 | 8 | 111 |
| 5. Zn addition, 1.5 g | 10.5 | 0.13 | 3.9 | 10.5 | 17 | 110 |
| 6. Zn addition, 1.5 g | 11.2 | 0.11 | 1 | 11 | 9 | 114 |
| Ga precipitation, pH 4.0 | 3.2 | <0.01 | 1.4 | 11 | 20 | 112 |

As the examples show, the copper in solution is almost completely cemented in the cementation stage. This is advantageous for the process because this avoids the precipitation of copper in the subsequent process stage, i.e. iron precipitation. If direct leaching is concerned, iron is generally precipitated as goethite. The copper precipitating with the iron precipitate is lost because the iron precipitate is process reject.

The invention claimed is:

1. A method for treating an acidic solution containing zinc sulphate in order to separate at least one metal or compounds of them in solution from the acidic solution containing zinc sulphate, whereby the metal to be separated is one of the group of indium, gallium and germanium, wherein the acidic solution containing zinc sulphate is neutralised in a pre-neutralisation stage to a pH value of 2.5-3.5 and wherein a precipitate formed in the pre-neutralisation stage is separated from the acidic solution containing zinc sulphate by solids-liquid separation and a precipitate obtained from the solids-liquid separation is subjected to a precipitate scrubbing and leaching stage and at least one of the group of metals or compounds of them to be separated is separated from the acidic solution containing zinc sulphate obtained from the solids-liquid separation in a cementation stage by means of zinc powder.

2. The method according to claim 1, wherein the precipitate formed in the pre-neutralisation stage contains a first portion of the gallium and indium of the acidic solution containing zinc sulphate.

3. The method according to claim 1, wherein the acidic solution containing zinc sulphate also contains copper, which is cemented from the solution in the cementation stage.

4. The method according to claim 1, wherein in the cementation stage, the germanium contained in solution is cemented from the acidic solution containing zinc sulphate.

5. The method according to claim 2, wherein in the cementation stage, a second portion of the indium contained in solution is cemented from the acidic solution containing zinc sulphate.

6. The method according to claim 2, wherein in the cementation stage, a second portion of the gallium contained in solution is precipitated from the acidic solution containing zinc sulphate.

7. The method according to claim 1, wherein the metals or compounds of them that were separated from the acidic solution containing zinc sulphate in the cementation stage are separated from solution by solids-liquid separation and the metals separated are subjected to the precipitate scrubbing and leaching stage.

8. The method according to claim 6, wherein, after cementation, the solution containing zinc sulphate containing gallium is subjected to a gallium precipitation stage, in which the solution is neutralised to a pH value of 3.2-4.0 in order to precipitate a third portion of the gallium.

9. The method according to claim 1, wherein a precipitate formed in a gallium precipitation stage is subjected to the precipitate scrubbing and leaching stage.

10. The method according to claim 1, wherein the precipitate formed in the pre-neutralisation stage, a precipitate formed in the cementation stage and a precipitate formed in a gallium precipitation stage are treated jointly with an acid-containing solution in the precipitate scrubbing and leaching stage in order to leach metals to be separated and to separate them from a metallic copper deposit.

11. A method for treating an acidic solution containing zinc sulphate in order to separate at least one metal or compounds of them in solution from the acidic solution containing zinc sulphate, whereby the metal to be separated is one of the group of indium, gallium and germanium, wherein the acidic solution containing zinc sulphate is neutralised in a pre-neutralisation stage to a pH value of 2.5-3.5 and wherein a precipitate formed in the pre-neutralisation stage is separated from the solution containing zinc sulphate by solids-liquid separation and the separated precipitate is subjected to a precipitate scrubbing and leaching stage and wherein a precipitate is formed in a cementation stage and the precipitate is contained in the acidic solution containing zinc sulphate and subjected to a gallium precipitation stage.

* * * * *